US012349773B2

(12) United States Patent
Winn

(10) Patent No.: US 12,349,773 B2
(45) **Date of Patent: *Jul. 8, 2025**

(54) ILLUMINATED WALKING ASSISTANCE APPARATUS

(71) Applicant: Ray Winn, Glendora, CA (US)

(72) Inventor: Ray Winn, Glendora, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/903,600

(22) Filed: Oct. 1, 2024

(65) Prior Publication Data

US 2025/0017335 A1 Jan. 16, 2025

Related U.S. Application Data

(63) Continuation of application No. 18/208,430, filed on Jun. 12, 2023, now Pat. No. 12,127,646, which is a (Continued)

(51) Int. Cl.
*A45B 3/04* (2006.01)
*A45B 9/00* (2006.01)
(Continued)

(52) U.S. Cl.
CPC ................ *A45B 3/04* (2013.01); *A61H 3/00* (2013.01); *A61H 3/061* (2013.01); *F21V 9/083* (2013.01);
(Continued)

(58) Field of Classification Search
CPC . A45B 3/02–04; A45B 7/00–005; A45B 9/02; A45B 2009/002; A61H 1/00; A61H 3/00; A61H 3/061; A61H 2201/0153–5097; A61H 2230/06; F21V 9/083; F21V 23/0464–0492; F21V 33/0004
See application file for complete search history.

(56) References Cited

U.S. PATENT DOCUMENTS

| | | |
|---|---|---|
| 1,824,449 A | 9/1931 | Sjoberg |
| 2,271,190 A | 1/1942 | Giaimo |

(Continued)

FOREIGN PATENT DOCUMENTS

| | | |
|---|---|---|
| CN | 202635825 U | 1/2013 |
| CN | 204131195 U | 1/2015 |

(Continued)

OTHER PUBLICATIONS

International Search Report and Written Opinion, PCT/US2019/020934, mailed May 17, 2019.

*Primary Examiner* — Jason M Han
(74) *Attorney, Agent, or Firm* — Master Key IP, LLP; Justin G. Sanders

(57) ABSTRACT

An illuminated walking assistance apparatus is disclosed. In at least one embodiment, the apparatus provides an elongated staff having a ground-engaging tip portion at a first end and a handle at an opposing second end. The staff provides a light pipe positioned proximal the tip portion and having a light-emitting member disposed therein to selectively illuminate the ground proximal the tip portion. The staff further provides a pilot light positioned in the handle which is always on so as to facilitate locating the apparatus in a dark environment.

20 Claims, 5 Drawing Sheets

Related U.S. Application Data continuation of application No. 17/395,460, filed on Aug. 6, 2021, now Pat. No. 11,712,093, which is a continuation of application No. 17/142,542, filed on Jan. 6, 2021, now Pat. No. 11,109,655, which is a continuation-in-part of application No. 16/471,276, filed as application No. PCT/US2019/020934 on Mar. 6, 2019, now Pat. No. 11,109,654.

(51) Int. Cl.

| | |
|---|---|
| ***A61H 3/00*** | (2006.01) |
| ***A61H 3/06*** | (2006.01) |
| ***F21V 9/08*** | (2018.01) |
| ***F21V 23/04*** | (2006.01) |
| ***F21V 33/00*** | (2006.01) |

(52) U.S. Cl.

CPC ...... *F21V 23/0464* (2013.01); *F21V 23/0471* (2013.01); *F21V 23/0492* (2013.01); *F21V 33/0004* (2013.01); *A45B 2009/002* (2013.01); *A61H 2201/0153* (2013.01); *A61H 2201/0188* (2013.01); *A61H 2201/0192* (2013.01); *A61H 2201/1635* (2013.01); *A61H 2201/5064* (2013.01); *A61H 2201/5084* (2013.01); *A61H 2230/06* (2013.01)

(56) References Cited

U.S. PATENT DOCUMENTS

| | | | | |
|---|---|---|---|---|
| 2,642,519 | A | 6/1953 | Caustin et al. | |
| 3,987,807 | A | 10/1976 | Varnell | |
| 4,013,881 | A | 3/1977 | Sargent | |
| 4,062,371 | A | 12/1977 | Bolen | |
| 4,099,535 | A | 7/1978 | Hubachek | |
| 4,562,850 | A | 1/1986 | Earley et al. | |
| 4,625,742 | A | 12/1986 | Phillips | |
| 4,837,666 | A | 6/1989 | Conkle | |
| 5,197,501 | A | 3/1993 | Ragatz | |
| 5,331,990 | A | 7/1994 | Hall et al. | |
| 5,351,704 | A | 10/1994 | Hunnicutt, Jr. et al. | |
| 5,577,827 | A | 11/1996 | Leffingwell et al. | |
| 5,582,196 | A | 12/1996 | Hae et al. | |
| 5,595,434 | A | 1/1997 | Pasch et al. | |
| 5,810,466 | A | 9/1998 | Young | |
| 5,960,805 | A | 10/1999 | Murphy | |
| 6,145,993 | A | 11/2000 | Filippino | |
| 6,267,481 | B1 | 7/2001 | Yang | |
| 6,394,116 | B1 | 5/2002 | Winn et al. | |
| 7,377,662 | B1 * | 5/2008 | Bernstein ................. | A45B 3/04 135/910 |
| 10,306,958 | B1 | 6/2019 | Oligie et al. | |
| 2004/0264172 | A1 | 12/2004 | Roberts | |
| 2005/0211284 | A1 | 9/2005 | Dooley | |
| 2006/0090783 | A1 | 5/2006 | King-Fai | |
| 2007/0000531 | A1 | 1/2007 | Russo | |
| 2008/0225513 | A1 | 9/2008 | Durfee et al. | |
| 2010/0147342 | A1 | 6/2010 | Navarro | |
| 2012/0080064 | A1 | 4/2012 | Gorey et al. | |
| 2015/0062874 | A1 | 3/2015 | Chien et al. | |
| 2015/0187197 | A1 | 7/2015 | Golomb et al. | |
| 2016/0341410 | A1 | 11/2016 | Kohn | |
| 2017/0175997 | A1 | 6/2017 | Rosenblum | |
| 2017/0224072 | A1 | 8/2017 | Van Varick et al. | |
| 2017/0224573 | A1 | 8/2017 | Challa | |
| 2018/0112851 | A1 | 4/2018 | Haungs | |
| 2018/0241489 | A1 | 8/2018 | Daoura et al. | |
| 2018/0356233 | A1 | 12/2018 | Baqain | |
| 2019/0142120 | A1 | 5/2019 | AlGhazi et al. | |
| 2020/0085157 | A1 | 3/2020 | Moyo | |

FOREIGN PATENT DOCUMENTS

| | | | |
|---|---|---|---|
| CN | 108030204 | A | 5/2018 |
| GB | 2404144 | A | 1/2005 |
| JP | 2002119315 | A | 4/2002 |
| JP | 2015078917 | A2 | 4/2015 |
| JP | 6170803 | B2 * | 7/2017 |

* cited by examiner

ILLUMINATED WALKING ASSISTANCE APPARATUS

RELATED APPLICATIONS

This is a continuation application and so claims the benefit pursuant to 35 U.S.C. § 120 of a prior filed and U.S. non-provisional patent application Ser. No. 18/208,430, filed on Jun. 12, 2023, which is itself a continuation of U.S. non-provisional patent application Ser. No. 17/395,460, filed on Aug. 6, 2021 (now U.S. Pat. No. 11,712,093, issued on Aug. 1, 2023), which is a continuation of U.S. non-provisional patent application Ser. No. 17/142,542, filed on Jan. 6, 2021 (now U.S. Pat. No. 11,109,655, issued on Sep. 7, 2021), which is a continuation-in-part of U.S. non-provisional patent application Ser. No. 16/471,276, filed on Jun. 19, 2019 (now U.S. Pat. No. 11,109,654, issued on Sep. 7, 2021), which is a 35 U.S.C. § 371 U.S. national stage entry of international application serial number PCT/US2019/020934, filed on Mar. 6, 2019. The contents of the aforementioned applications are incorporated herein by reference.

BACKGROUND

The subject of this patent application relates generally to apparatus for assisting individuals in walking and more particularly to such an apparatus which provides general illumination in the immediate vicinity of the apparatus and also provides additional illumination which may be activated by the user for various purposes such as signaling others, finding a desired item and assisting the user to find the apparatus in the dark.

Applicant(s) hereby incorporate herein by reference any and all patents and published patent applications cited or referred to in this application.

By way of background, the prior art discloses a multitude of devices having self-contained illumination apparatus therein which are used either to aid persons in seeing better or used as a beacon or the like to designate the user's position to others. Light sources have been incorporated into the elongated shaft of the device or attached thereto in a manner to cast light for use by the user. Although the known prior art devices function for the purposes intended, the need remains for an illuminated walking assistance apparatus which not only provides illumination to assist the user, a bright beacon-type light for signaling or warning purposes, but also an illuminated walking assistance apparatus which provides additional light means to assist the user.

Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing an illuminated walking assistance apparatus. In at least one embodiment, the apparatus provides an elongated staff having a ground-engaging tip portion at a first end and a handle at an opposing second end. The staff provides a light pipe positioned proximal the tip portion and having a light-emitting member disposed therein to selectively illuminate the ground proximal the tip portion. The staff further provides a red nightlight which is always on so as to facilitate locating the apparatus in a dark environment.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Figure 1:
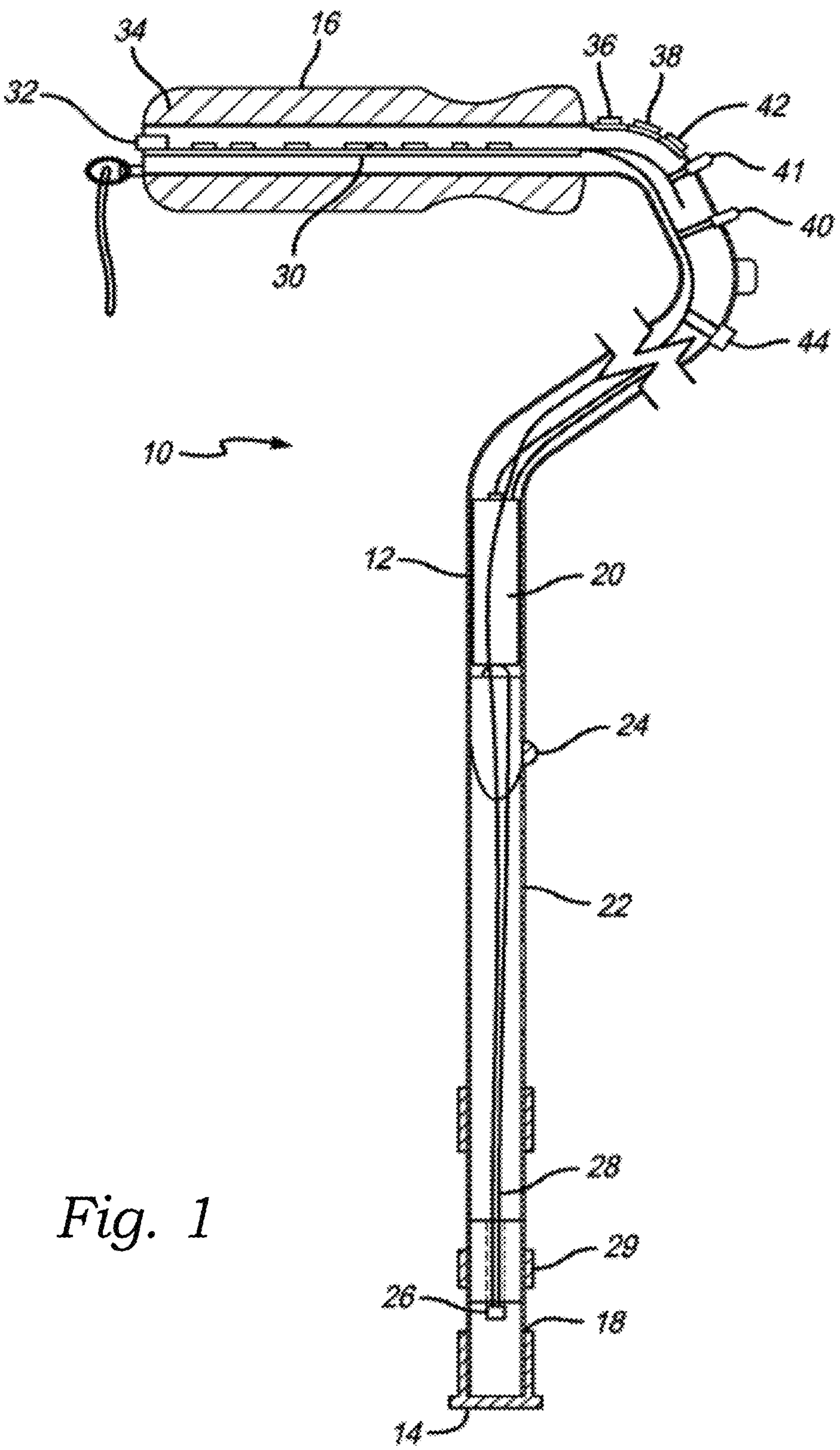
FIG. 1 is a schematic representation of an exemplary walking assistance apparatus, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

At the outset, it should be noted that the walking assistance apparatus 10 of the present invention may take many forms such as a stick used by hikers or walkers and may be used for various purposes. For ease of illustration, the following description is presented using a walking cane as an exemplary embodiment of the apparatus 10; however, the present invention should not to be taken as to be so limited. Again, in further embodiments, the apparatus 10 may take on any other form of walking aid, now known or later developed, so long as the apparatus is capable of providing the functionality described herein. The apparatus 10 provides sufficient illumination to light the pathway of a user of the apparatus during nighttime or reduced light situations and also includes additional light sources activatable by switches controlled by the user to assist the user in various ways. For example, in at least one embodiment, a pilot light is provided that is maintained in an illuminated condition at all times to assist the user in finding the apparatus 10 particularly at night. In at least one such embodiment, the pilot light is configured for flashing or blinking when the battery 20 (discussed further below) falls below a predefined charge level, so that the user can be alerted to the fact that the battery 20 needs to be recharged. In at least one embodiment, the pilot light is configured for emitting a red colored light. In at least one alternate embodiment, the pilot light is configured for emitting a white colored light. In still further embodiments, the pilot light is configured for emitting any other color of light, now known or later developed. In at least one embodiment, there is also provided an additional high intensity LED controlled by a switch activated by the user to provide additional light for reading, finding a key-hole, illuminating a menu or finding a seat in a darkened theater or the like. In at least one embodiment, an additional switch activatable by the user also will cause the main illumination LED at the tip of the apparatus 10 to flash to thereby warn others of the existence of the user of the apparatus 10 or to attract attention such as to hail a cab or the like. In addition, in at least one embodiment, to assist the user there is provided a motion sensor which automatically illuminates the main LED at the tip of the apparatus 10 when the apparatus 10 is in actual use and also provides an ambient light sensor which precludes the apparatus 10 from having the main LED light activated when there is sufficient light for the user to utilize the apparatus 10 without illumination assistance.

Referring now to the drawings and more particularly to FIG. 1, there is shown generally at 10 a schematic diagram of an exemplary embodiment of the apparatus 10. The apparatus 10 may be configured as an umbrella, a hiking stick or other types of walking aids. The apparatus 10 includes an elongated staff 12 which has a ground engaging tip 14 at one end thereof and a handle 16 at the other end thereof. In at least one embodiment, the handle 16 is constructed out of, or is otherwise coated with, an antimicrobial material (or a material infused with antimicrobial materials or properties) so as to provide protection from or retard the growth of bacterium or viruses on the surface of the handle 16, and to destabilize any bacteria or bacterium that might be transferred to the handle 16 from the user's hand. The ground engaging tip 14 may also be a tripod or a large base that will provide the function of a standalone cane. The elongated staff 12 includes a light pipe 18 disposed adjacent the tip 14. In at least one embodiment, the light pipe 18 includes a frosted or diffused section and a clear or polished section. In at least one embodiment, a red filter on a sliding tube of red transparent or translucent plastic 29 is provided for optional night time use. In at least one alternate embodiment, the light pipe 18 simply provides a red-colored light. The red light provides enough illumination for navigating in a typical bedroom environment, while reducing the effects of the well-known phenomena of REM sleep cycle interruption by white light. Red light is known to reduce this interruptive effect significantly. In at least one embodiment, the red-colored light is a LUXION L135-R625993500000 having a full width half maximum ("FWHM") of between 620 nm and 630 nm, with the peak at approximately 625 nm. However, in further embodiments, the red-colored light may be any other type of light emitting device capable of emitting a red-colored light in the appropriate wavelength range for minimizing melatonin shutdown and offering sufficient light sensitivity. In at least one embodiment, the elongated shaft 12 of the apparatus 10 is hollow and receives a battery 20 internally thereof. In at least one alternate embodiment, the battery 20 is positioned elsewhere, such as in the handle 16, for example. In at least one embodiment, the apparatus 10 is also adjustable to various heights as may be needed by users. In at least one such embodiment, such adjustment is through utilization of a plurality of detent holes 22 and a detent ball 24 as is well recognized by those skilled in the art. In at least one embodiment, the main illumination member contained within the apparatus 10 is a high intensity LED 26 which is connected by appropriate wiring 28 to a control circuit which is contained within a circuit board 30 which is disposed internally of the handle 16. The circuit board 30 includes a control circuit and a USB port 32 as will be more fully described hereinbelow. As is well known by those skilled in the art, the handle 16 includes a grip 34 in at least one embodiment. In at least one such embodiment, the grip is constructed out of foam, rubber or any other suitable material (or combination of materials), now known or later developed. Additionally, in at least one such embodiment, the grip 34 contains antimicrobial properties similar to those described above. Although the handle 16 is shown disposed orthogonally to the longitudinal axis of the elongated shaft 12, it will be understood by those skilled in the art that the shaft 12 may be a continuous straight shaft 12 with a handle 16 disposed at the end thereof. It is, however, in accordance with a preferred embodiment of the apparatus 10 to utilize the handle 16 orthogonally disposed to the elongated shaft 12 as illustrated in FIG. 1. The primary reason for this is to enable the user to easily access the various control switches which are disposed on the elongated shaft 12.

The switches as disposed on the elongated shaft 12 include an ON switch 36. This switch 36 is an ON switch that activates the timer turning the light on, after the time runs down, the light goes off unless the switch 36 is held in the ON position. Upon release, the light turns off after the timer runs down. In at least one embodiment, a further switch 38 is included to control the illumination of a reading light 40. In at least one embodiment, the apparatus 10 provides a still further switch 42 which when activated by the user will cause the LED 26 to flash so as to attract attention or to warn others of the existence of the user. In at least one embodiment, the apparatus further provides an ambient light sensor 44. The purpose of the ambient light sensor 44 is to prevent the illumination of the high intensity LED 26 when there is sufficient ambient light for the user to be able to use the apparatus 10 without the necessity of illumination. The ON switch 36 overrides the light sensor 44, motion sensor and flash functions. In at least one embodiment, there is also provided a pilot light 41 which is always on to assist the user in finding the apparatus 10.

In at least one embodiment, the circuit board contains a motion sensor which will be described more fully hereinbelow which when the apparatus 10 is in use will automatically illuminate the high intensity LED 26 and the circuit board also includes a timer such that when the apparatus 10 is no longer in motion, the high intensity LED 26 will be automatically extinguished after a predetermined period of time.

In at least one embodiment, as will be well understood by those skilled in the art, ribbon wire is disposed in contact with the various switches and the various lights and the control circuit which is contained on the circuit board as well as the battery 20 to provide appropriate access to the control circuit and to the switches and to the various lights to be activated as desired by the user.

Figure 2:
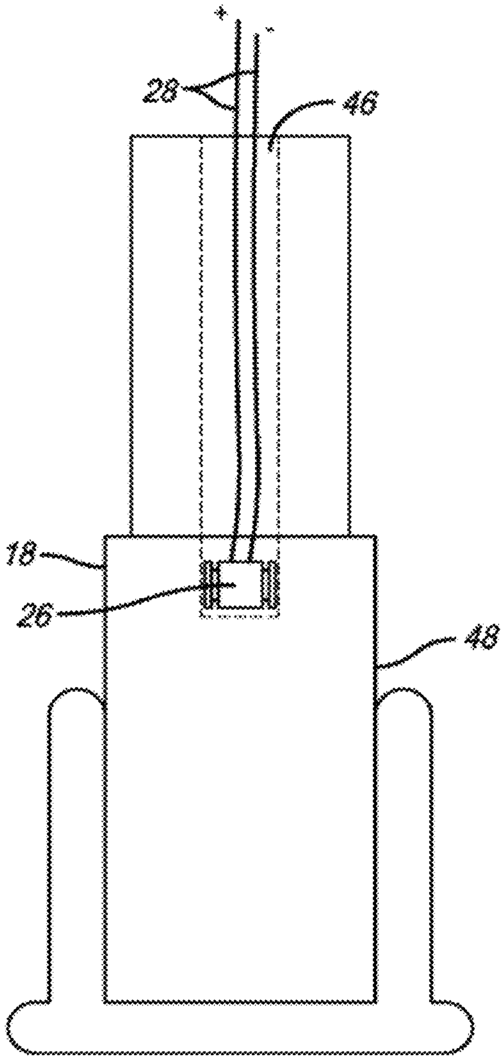
FIG. 2 is a fragmentary view of a lower portion thereof, in accordance with at least one embodiment.

Referring now more particularly to FIG. 2, an exemplary embodiment of the light pipe 18 assembly is disclosed in additional detail. As is therein shown, in at least one such embodiment, the light pipe 18 includes a counterbore 46 through which the wiring 28 extends to the LED array 26. The lower portion 48 of the light pipe 18 may be diffused to provide diffused illumination for use by the user and at the same time may also have a clear section so that bright light will emanate from the section 48 to alert others of the existence of the user or to emit the high intensity LED when it is flashing to alert others or to hail a taxi cab or the like.

Figure 3:
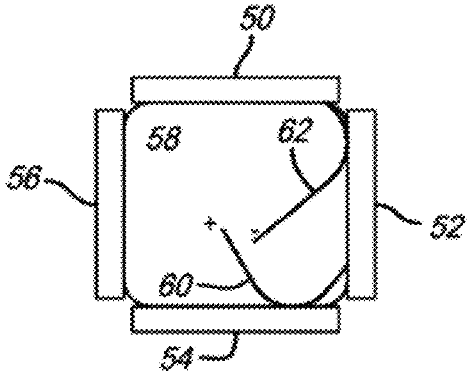
FIG. 3 is a top plan view of an exemplary LED array positioned within the lower portion of the apparatus, in accordance with at least one embodiment.

In accordance with the preferred embodiment of the present invention, the LED array includes four LED chips 50, 52, 54 and 56 as shown in FIG. 3 which are mounted upon a substrate 58 that is disposed internally of the light pipe 18. The LED chips 50 through 56 have appropriate electrical connections thereto as shown by the leads 60 and 62 to provide electrical energy from the battery 20 to the LEDs to activate them to cause the high intensity light to be emanated from the LED 26. In further embodiments, other quantities and arrangements of LED chips may be substituted.

In at least one embodiment, the handle 16 provides a color switch configured for allowing the user to selectively change the color of light being emitted from the light pipe 18 between white and red. This allows the user to put the color switch in the red position before going to bed so that the red light comes on automatically so the user does not turn on any other light source, thereby interrupting the circadian/melatonin shutdown of the sleep cycle. It also allows the user to pick which color light they like to use as an alert or emergency signaling device. In at least one further embodiment, the color switch is a three-position switch configured for allowing the user to selectively switch between a white-colored light, a red-colored light, and no light. The off provision allows both light colors to be disabled to keep the light from coming on in a situation wherein it would be disturbing to others, such as a concert or movie theater. In at least one such embodiment, the off position does not keep the pilot light or the reading light from operating, nor does it interfere with the battery charger.

Figure 6:
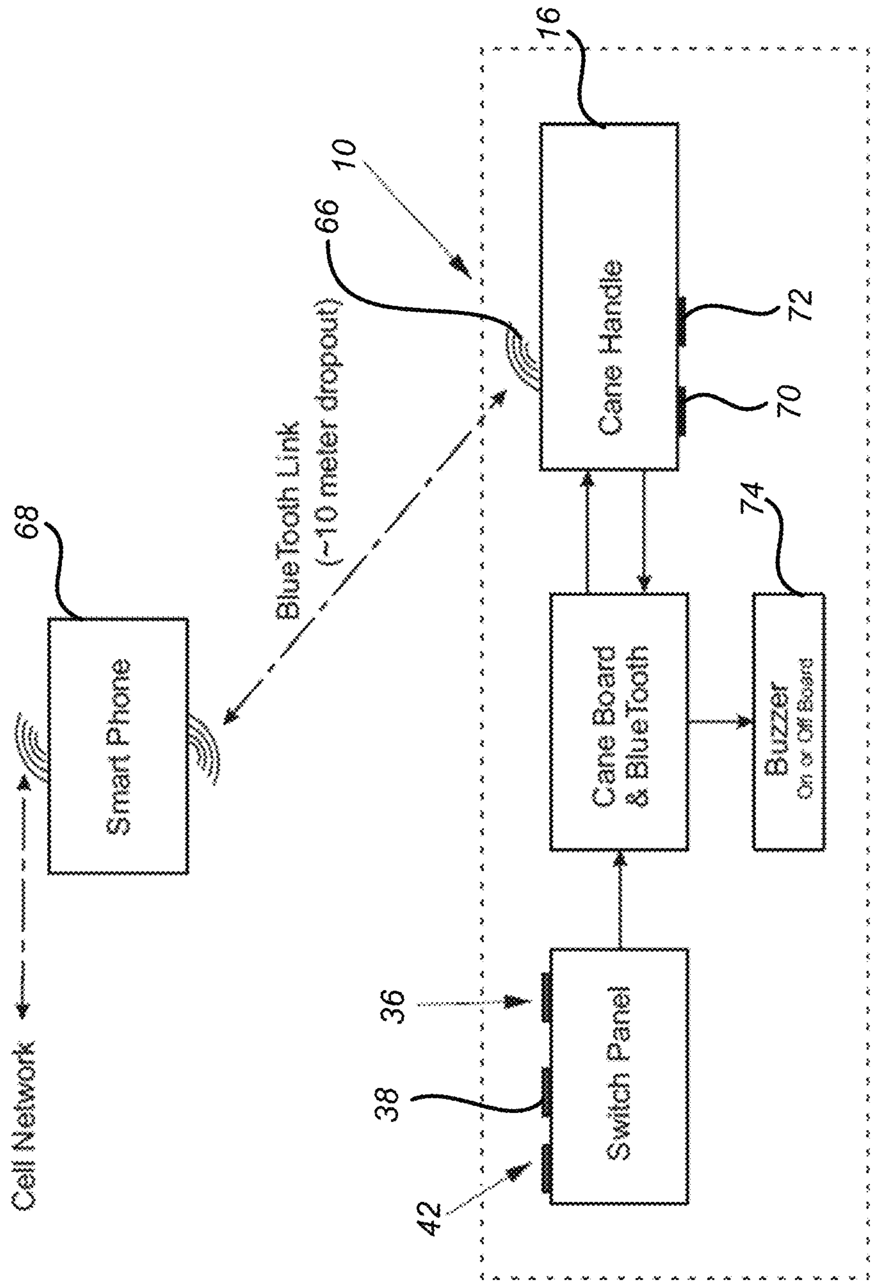
FIG. 6 is a schematic representation of a further exemplary walking assistance apparatus, in accordance with at least one embodiment.

In at least one embodiment, as illustrated in FIG. 6, the apparatus 10 provides a transceiver 66 in selective communication with an at least one user device 68, as discussed further below. In at least one embodiment, the transceiver 66 utilizes Bluetooth; however, in further embodiments, communication between the transceiver 66 at the at least one user device 68 may be achieved using any wired- or wireless-based communication protocol (or combination of protocols) now known or later developed. As such, the present invention should not be read as being limited to any one particular type of communication protocol, even though certain exemplary protocols may be mentioned herein for illustrative purposes. Similarly, in at least one embodiment, communications between each of the transceiver 66 and at least one user device 68 may be encrypted using any encryption method (or combination of methods) now known or later developed. It should also be noted that the term "user device" is intended to include any type of computing or electronic device, now known or later developed, capable of communicating with the transceiver 66 and carrying out the functionality described herein—such as desktop computers, browser extensions, mobile phones, smartphones, laptop computers, tablet computers, personal data assistants, gaming devices, wearable devices, etc. As such, the present invention should not be read as being limited to use with any one particular type of computing or electronic device, even though certain exemplary devices may be mentioned or shown herein for illustrative purposes.

In at least one embodiment, the transceiver 66 and the at least one user device 68 are configured for remaining in continuous communication when the transceiver 66 and user device 68 are within communication range of one another. For example, where the transceiver 66 utilizes Bluetooth, the communication range may be roughly 10 meters. In at least one such embodiment, upon the transceiver 66 and user device 68 moving beyond communication range from one another, the apparatus 10 is configured for notifying the user of the loss in connection with the user device 68—for example, by generating one or more of an audio-based, a visual-based, or a haptic-based "out of range" alert. Similarly, in at least one such embodiment, upon the transceiver 66 and user device 68 moving beyond communication range from one another, the user device 68 is configured for notifying the user of the loss in connection with the apparatus 10—for example, by generating one or more of an audio-based, a visual-based, or a haptic-based "out of range" alert. Such alerts can be useful in situations where the user might accidentally leave the user device 68 or the apparatus 10 behind, such that the user won't get too far before being notified of their mistake.

With continued reference to FIG. 6, in at least one embodiment, the apparatus 10 further provides an at least one heartbeat sensor 70 positioned within the handle 16 so as to be in contact with a hand or finger of the user during use of the apparatus 10 in order to selectively monitor the user's heartbeat. In at least one such embodiment, the at least one heartbeat sensor 70 is selectively activated by the user via the ON switch 36. For example, in one such embodiment, upon the ON switch 36 being pressed twice in short succession, the at least one heartbeat sensor 70 is selectively activated or deactivated. In further embodiments, the at least one heartbeat sensor 70 may be selectively activated and deactivated via other mechanisms. In at least one alternate embodiment, the at least one heartbeat sensor 70 is always active while the apparatus 10 is powered on. In at least one embodiment, the at least one heartbeat sensor 70 utilizes a light source that illuminates an interior of the user's finger, along with a photo sensor that measures variation in blood flow. In at least one alternate embodiment, the at least one heartbeat sensor 70 measures slight differences in electrical signals between the user's fingers as the blood pulses are sensed. In further alternate embodiments, any other type of sensor, now known or later developed, capable of measuring the user's heartbeat may be substituted. In at least one still further embodiment, the apparatus 10 further provides an at least one blood oxygen sensor positioned within the handle 16 and configured for measuring a blood oxygen level of the user. In at least one embodiment, the data gathered by the apparatus 10 is transmitted to the associated user device 68 via the transceiver 66, where the data may be stored and/or further analyzed as desired—either on the user device 68 itself or via another computing device to which the data is transferred.

With continued reference to FIG. 6, in at least one embodiment, the apparatus 10 further provides an at least one motion sensor 72 (either a different motion sensor or the same motion sensor discussed above) positioned and configured for determining whether the apparatus 10 is in contact with the ground (i.e., the surface upon which the user is traversing) which, in turn, enables the apparatus 10 to track the number of steps taken by the user. In at least one such embodiment, the at least one motion sensor 72 is selectively activated by the user via the ON switch 36. For example, in one such embodiment, upon the ON switch 36 being pressed three times in short succession, the at least one motion sensor 72 is selectively activated or deactivated. In at least one embodiment, the apparatus 10 only begins measuring steps after the user has taken a few initial steps so as to eliminate step counting when the apparatus 10 is being intermittently moved (i.e., moved when the user is not actually walking). Additionally, in at least one such embodiment, the step counting continues until either the step motion of the apparatus 10 ceases for a pre-defined period of time (such as 30 seconds, for example), or until the at least one motion sensor 72 is selectively deactivated. In further embodiments, the at least one motion sensor 72 may be selectively activated and deactivated via other mechanisms. In at least one alternate embodiment, the at least one motion sensor 72 is always active while the apparatus 10 is powered on. In at least one embodiment, the at least one motion sensor 72 is a tri-axial accelerometer; however, in further embodiments, any other type of sensor, now known or later developed, capable of measuring movement of the apparatus 10 relative to the ground may be substituted. In at least one embodiment, the data gathered by the apparatus 10 is transmitted to the associated user device 68 via the transceiver 66, where the data may be stored and/or further analyzed as desired-either on the user device 68 itself or via another computing device to which the data is transferred.

Figure 4:
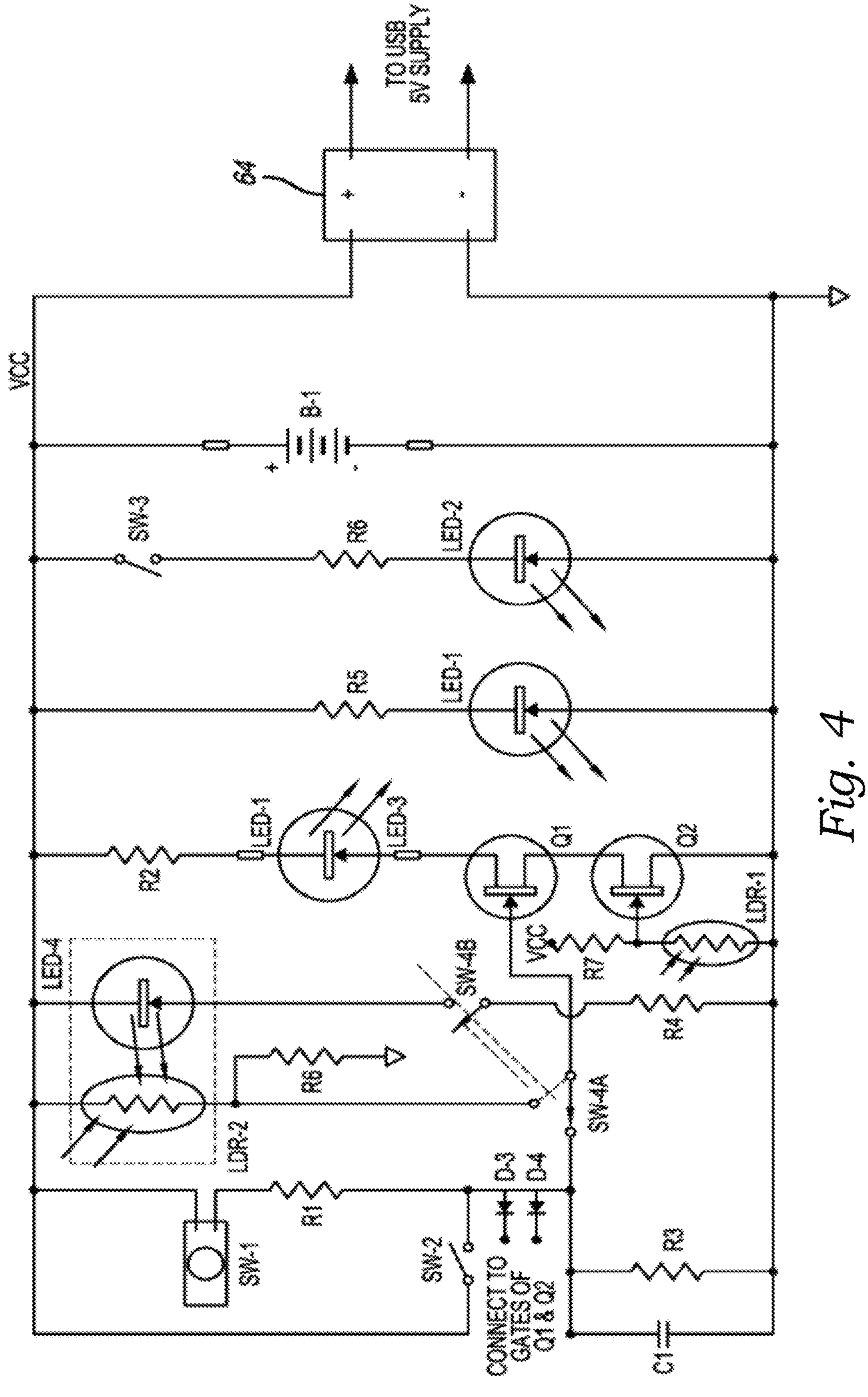
FIG. 4 is a schematic diagram of an exemplary analog control circuit of the apparatus, in accordance with at least one embodiment.

Referring now more particularly to FIG. 4, there is shown a schematic diagram of an exemplary analog circuit which is utilized to control the high intensity LED 26 at the tip 14 of the apparatus 10 in at least one embodiment. The following will be a description of the manner in which the circuit operates in at least one embodiment. A battery B1 supplies electrical energy to the various components in the circuit. In a darkened room with the main switch 36 (SW-2) in the position shown, the field effect transistor Q2 is in conduction due to the resistor R7 holding the base of Q2 positive while the light dependent resistor LDR-1 is near infinite resistance. When motion switch SW-1 closes temporarily by movement of the apparatus 10, positive voltage is applied through resistor R1 so that resistor R3 charges capacitor C1 to a voltage which is applied through switch SW-4A that causes field effect transistor Q1 to conduct thus completing the circuit causing current to flow through Q1, Q2, R2 and the main LED array 26 which is shown as LED-3 on the diagram. This also forward biases diodes D-3 and D-4. Resistor R3 is in parallel with capacitor C1 and slowly discharges capacitor C1 towards ground with a predetermined time period at which time the main light slowly dims and then extinguishes. A typical timeout period might be about 15 to 30 seconds or other time of convenience as may be desired. If the apparatus 10 senses any further motion during the timeout period, it recharges capacitor C1 back to the supply voltage, thus keeping the main LED-3 on as long as the apparatus 10 is in motion. Once the apparatus 10 is put to rest, the light will automatically go off after the timeout period expires. The auto ON function when the apparatus 10 is moved does not operate if there is sufficient light for the user to safely use the apparatus 10, thus conserving battery power. The auto ON function is enabled when the ambient light falls below a certain level. LDR-1 is a light-dependent resistor that reduces its resistance as the ambient light increases causing the base of field effect transistor Q2 to be connected to ground, thus preventing it from conducting current. This interrupts the current flow through Q1, R3 and LED-3. When there is adequate ambient light, the resistance of the light-dependent resistor is reduced bringing the gate of Q1 low thus preventing Q1 from conducting even with inputs from the motion detection switch.

If the user needs to turn the high intensity LED 26 (LED-3) on manually, that is accomplished with push button switch 36 (SW-4A) which connects the gate of field effect transistor Q1 directly to the positive voltage bus. The gate of Q2 is held positive by resistor LDR-1 and the connection to the positive bus Vcc. By applying voltage to both gates of field effect transistors Q1 and Q2, any other input signal from any other source has no effect. This function is useful when the user wants to use the main light to read a menu or program, search under a bed, find seat location at an event, look in a closet or other use. The light turns off when the switch is released, either after a timeout period in a darkened room, or immediately in a lighted room.

The user can also employ the main light as an emergency or attention-getting flasher. The built-in function is activated by operating the flash switch 42 (SW-4B) to the alternate position. It is a push-on/push-off alternate action switch that does not require the user to hold it on. The operation is accomplished by LDR-2 and LED-4. When the switch is operated, the gate of Q1 is moved from its normal connection to the junction of LDR-2 and LED-4. When the switch is operated, the gate of Q1 is moved from its normal connection to the junction of LDR-2 and R6. The switch also connects the flashing LED-4 via R4 causing it to flash repeatedly. A rate of about six times per second might be typical. It is optically coupled to light sensitive resistor LDR-2. When the flasher is on, the resistance of LDR-2 drops to a very low value, causing the voltage of the gate of Q1 to rise. This results in turning the main LED 26 (LED-3) to light in synchronism with the flashing LED. When the flasher is off, the resistance rises, thus reducing the current flowing to the gate of Q1. R6 insures that the gate is brought to near common potential between flashes by discharging distributed capacitance on the circuit board. The user must operate the switch 42 again to stop the flashing and return the system to normal operating condition. This timing method has been employed for two reasons: 1) it does not require the use of an active switching device which is more expensive and 2) it does not give rise to any FCC licensing or tagging requirements. Alternatively, an electronic multivibrator could be used to send ON/OFF signals to the gates of Q1 and Q2 and can be implemented by anyone skilled in the art.

A pilot light 41 (LED-1) is connected through resistor R5 between the positive voltage bus and ground and is therefore always ON as long as the battery is charged. The function of the pilot light is to assist the user in locating the apparatus 10 in a darkened room. The operating current is a nominal 1.5 milliamps. It will not discharge the battery unless the apparatus 10 is not used for a substantial period of time such as three to five months.

The reading light 40 (LED-2) is located near the head end of the apparatus 10 as shown in FIG. 1 and therefore provides the user with a convenient light source for locating a door key, reading menus, maps, programs at events or is a handy bedside light source. It is operated with a momentary push button switch 38 (SW-3) forcing current through resistor R6 and LED-2.

The battery 20 is charged using an industry supplied charger 64 which is internal to the container pod. The charger derives its voltage from an industry standard 5 Volt USB port 32 located on the handle 16 of the apparatus 10. Thus, the voltage can be derived via a phone charger, computer port or from a standalone USB power supply.

Figure 5:
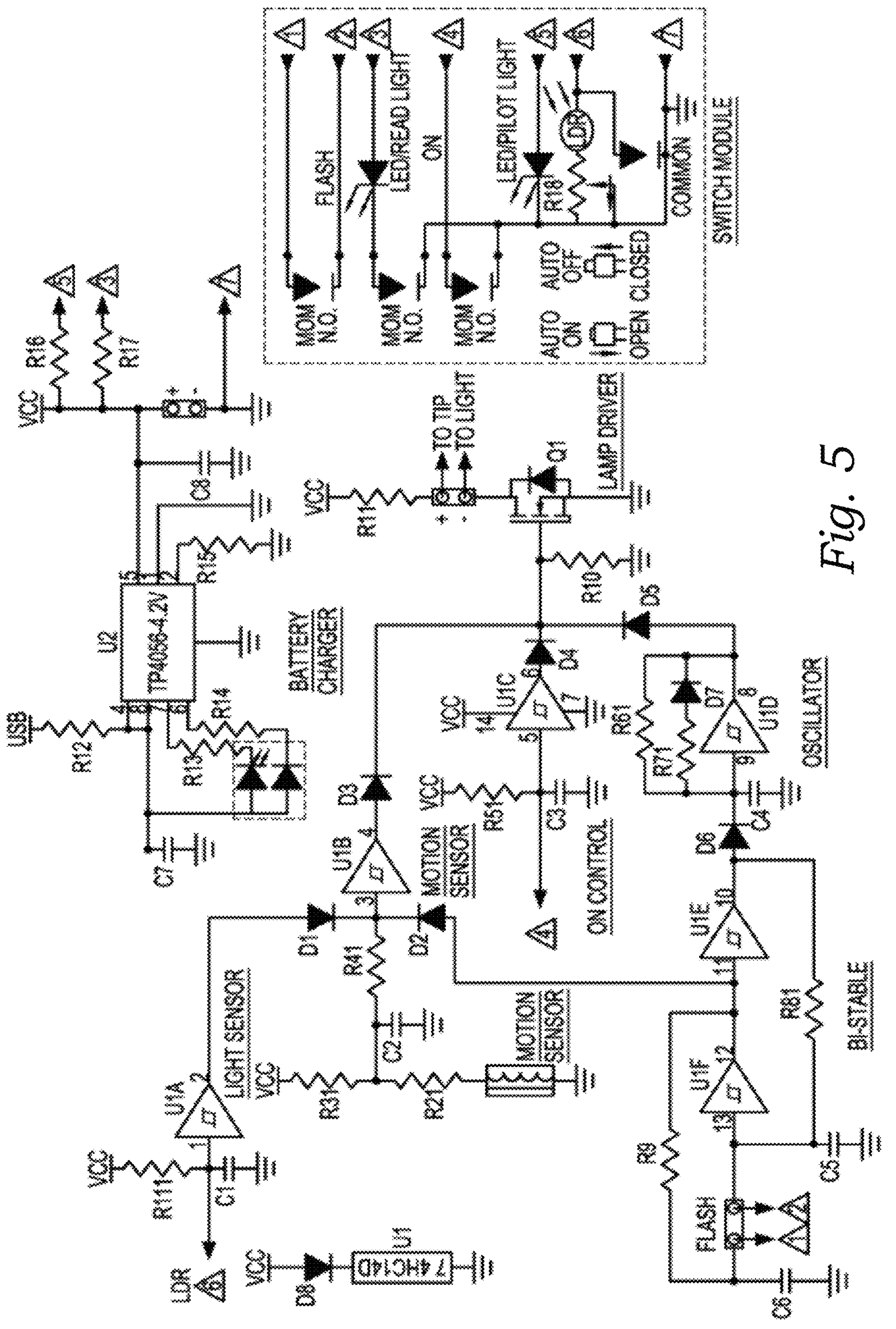
FIG. 5 is a schematic diagram of an exemplary digital circuit of the apparatus, in accordance with at least one embodiment.

Referring now to FIG. 5, in at least one embodiment, the light sensor consists of Schmidt trigger U1A, R111, C1, and the light sensitive resistor (LDR) and R18, the latter two located in the switch module. This circuit acts as a threshold voltage detector with hysteresis. The remote light sensitive resistor, LDR, R18 (switch module) and R111 form a voltage divider network. The LDR exhibits a very high resistance in the dark and decreases in resistance in lighted conditions. A sensitivity adjustment is provided by R18 connected as a variable resistor which is in series with the LDR, returning to circuit common; hereinafter referred to as ground. If the resistance of the combination of the LDR and R18 are higher than R111, then the input of U1A goes positive, and the output on pin 2 goes to ground as it is an inverting device. If the resistance of the LDR and R17 become lower than R111, then the output at pin 2 goes positive and is applied to pin 3 of U1B through diode D1, driving the output of U1B to ground. C1 acts as a smoothing filter to avoid noises such as ambient light flickering as in fluorescent lighting or other aperiodic changes in ambient light conditions. U1B also has some hysteresis in that once it is triggered in one direction, the input must change significantly to cause a change in the other direction. This function is well known to those skilled in the art and is an inherent characteristic of Schmidt trigger devices.

In the motion sensor section, R31 charges C2 to VCC, applying VCC to pin 3 of U1B through R41. D1 and D2 are back biased, preventing current to flow backwards to U1A and U1E/F. This drives pin 4 to ground, absent any other signal. When the motion switch is activated by movement of the apparatus 10, the internal contacts momentarily close, discharging C2 to ground, causing the output of U1B to go positive which applies a positive voltage through D3 to the gate of MOS transistor Q1 which in turn applies current from +VCC through R11 and the LED light array located at the tip 14 of the apparatus 10. However, this action is overridden if the resistance of the LDR and R17 is lower (presence of light) than the value of R111 because of high light conditions which causes the output of U1A to go positive, driving the output of U1B to ground removing the positive signal to Q1. Resistor R41 prevents any signal caused by the motion switch to overcome the higher current signal from the light sensor from U1A. If the LDR and R17 resistance is higher because of low light levels, this causes the output of U1B to go negative. In the meantime, C2 is charging at a time constant depending on the value of R111 and C1. D1 and D2 prevent any back current leakage if their sources of voltage are at ground. At these conditions, movement of the apparatus 10 will cause the motion sensor to intermittently impart a negative signal to the input of U1B. This causes the output of U1B to go positive and causes Q1 to conduct. The net effect is that if the light level is low, then movement of the apparatus 10 will cause pin 3 of U1B to go low. When the voltage on C1 is below the trigger level, the positive output of U1B causes Q1 to conduct. When the voltage of C1 reaches the trigger threshold, the output of U1B goes to ground, causing Q1 to be non-conducting. The purpose of these two circuits is to ensure that the tip 14 is lighted when illumination is low, and the apparatus 10 is in motion. Conversely, when the light level is high, the Q1 is prevented from conducting despite apparatus 10 motion. In low light conditions, the light will extinguish in about 15-20 seconds after motion ceases. If the apparatus 10 is moved into a lighted location before the timer has completed its cycle, the light will extinguish, and the timing cycle is terminated. R21 protects the contacts of the motion sensor from high inrush currents from C2, extending the life of the motion sensor and reducing the probability of high current 'welding' of the contacts and increasing lifetime of the motion sensor.

In at least one embodiment, a flash function is provided for emergency or signaling situations such as hailing a taxi or extra notice in a crosswalk. The flash operates independently of the light and motion functions and overrides both the light and motion functions. This function is operated by alternately pressing the red flash switch 42 on the switch module. In at least one such embodiment, pressing the flash switch 42 for a pre-defined period of time will also activate an audible signal, such as a buzzer 74 or other audio-based alert. Additionally, in at least one embodiment, the transceiver 66 simultaneously transmits a signal to the associated user device 68 which, in turn, transmits a pre-defined message to an at least one pre-defined recipient—such as a friend, family member, caretaker, medical alert service, or emergency responders, for example. In at least one further embodiment, the apparatus 10 may provide a separate, dedicated button for causing the transceiver 66 to transmit such pre-defined messages upon being pressed by the user. Additionally, in at least one further embodiment, the transceiver 66 is capable of transmitting such pre-defined messages directly to the at least one pre-defined recipient, without the need for the associated user device 68—particularly where the transceiver 66 utilizes a long-range communication protocol such as a cellular network, for example. Such pre-defined messages could be one or both of text-based messages or audio-based messages. Additionally, in at least one embodiment, the user device 68 further transmits the GPS coordinates of the user device 68 (based on a GPS chip contained within the user device 68) to the at least one recipient, so that the user may be easily located. In at least one alternate embodiment, the apparatus 10 provides an onboard GPS chip for determining the GPS coordinates of the apparatus 10 at any given time. In at least one such alternate embodiment, the GPS coordinates of the apparatus 10 are transmitted to the user device 68 upon the flash switch 42 being pressed for a pre-defined period of time. U1E and U1F are connected with C5, C6, R8 and R9 to form a BI-STABLE 'flip-flop'. A circuit that is well known to those skilled in the art. Alternate closures of the FLASH contacts /1\ /2\ cause the bi-stable to go alternately from state 0 to state 1. In state 0, the voltage on pin 11 of U1E and pin 12 of U1F is positive and the voltage on pin 10 of U1E is near ground. Thus, in state 0, the input of pin 3 of U1B is driven positive from the voltage of pin 11 & 12 of U1E and U1F through D2. This drives pin 4 of U1B to ground, essentially disabling all action from the Light Sensor and Motion Sensor functions. In state 0, pin 10 of U1E is near ground, allowing the relaxation oscillator comprised of C4, R61, R71, UID and D7 to operate. The output of the oscillator drives a voltage through D5, causing Q1 to alternately conduct at the frequency of the oscillator. For the values shown, this is approximately 2 flashes per second, but can be changed by appropriate selection of the values of C4, R61, R71 and D7. When the bi-stable is in state 1, the voltage at pin 11 and 12 of U1F and U1E is near ground, thus removing the signal to U1B. In state 1, the voltage at pin 9 of U1E is positive, driving the voltage of pin 8 of U1D to near ground, thus disabling the oscillator.

When the output of the oscillator is positive, C4 is charged through R61. When the output of the oscillator is negative, C4 is discharged by R61 and the parallel combination series impedance of R71 and D7. This creates asymmetry in the positive and negative times of the oscillator, with the positive output (light on) being longer than the negative cycle (light off) for the values shown. This is desired to provide an increased sense of brightness to a viewer while maintaining the attention-getting feature of a flashing light. The frequency of approximately 2 Hz is below the frequency that causes spatial disorientation of most people. R10 provides a discharge path for the residual input capacitance of Q1's gate, ensuring that the gate returns to ground before the next positive pulse from the oscillator. The battery voltage can reach a voltage of over 4.05 volts, causing the oscillator to 'latch' in the positive output. To alleviate this situation, D6 is connected in series with VCC and the power input terminal of U1D, thus reducing the voltage for U1D by approximately 0.5 volts, ensuring that the oscillator does not self-latch.

An ON control switch function is provided if the user wants to turn on the tip light of the apparatus 10 in an otherwise lighted condition, such as searching for a misplaced item in a darkened closet in a well-lighted room or needing light augmentation at their discretion. The green ON switch, located in the Switch Module is a momentary normally open switch. C3 is charged to +VCC by resistor R51. When the ON switch is closed momentarily and released, pin 5 of U1C goes to ground and pin 6 of U1C goes positive. The voltage is coupled through D4 causing Q1 to conduct, turning the tip light on. After a time period determined by the value of C4 and R51, pin 5 of UC1 goes to ground, removing the signal to the base of Q1. Each momentary push of the ON switch resets the timer. Given the combination of hysteresis and values of C3 and R51, the on time is about 15-20 seconds, but can be modified by those skilled in the art. If the ON switch is held on, the light remains lit and turns off when the switch is released after the timer runs its course. The ON function overrides all other functions including the light sensor function and the motion sensor function. D3 and D5 prevent back feeding of signals to the rest of the circuitry.

A pilot light function is provided from an 'always on' connection through R16 to a small LED lamp on the switch module, providing location assistance to the uses in a darkened environment, such as at bedside.

A read light function is provided by pressing a yellow momentary switch on the switch module to an LED mounted at the head of the switch module. This gives the user a light source to read menus, concert programs or other requirements. Power is provided from VCC through R17.

An optional auto disable alternate action switch in the switch module allows the user to disable the motion sensor function in the event of being carried in an aircraft, vehicle over rough roads, shipping, or long-term storage of the apparatus 10. This is implemented by connecting pin 1 of U1A to ground, causing pin 2 of U1A to positive and pin 4 of U1B to go negative. This function only disables the motion switch function. All other functions remain active at the option of the user.

A battery charger function is provided using an industry standard Li-Ion (U2) charger circuit. The input power to the charging circuit is via a USB connector at the back of the handle 16 as depicted in FIG. 1. A single bi-color led with resistors R13 and R14 next to the USB connector indicates the state of charge of the Li-Ion battery which is located in the apparatus 10 body as depicted in FIG. 1. C7 and R12 serve to reduce high frequency noise and other spurious artifacts in the external charging device. An external standard 5-volt USB charger supplies the power for the battery charger circuit. R15 sets that maximum current to be delivered from the battery charger circuit. For this circuit, the 2.7K value sets the typical charging current to a maximum of approximately 400 milli-amperes. C8 provides further filtering and noise free charging current to the battery.

Aspects of the present specification may also be described as the following embodiments:

1. An illuminated walking assistance apparatus comprising: an elongated staff having a ground-engaging tip portion at a first end and a handle at an opposing second end; the staff providing a light pipe positioned proximal the tip portion and having a light-emitting member disposed therein to selectively illuminate the ground proximal the tip portion; and the staff further providing a red nightlight which is always on so as to facilitate locating the apparatus in a dark environment.

2. The illuminated walking assistance apparatus according to embodiment 1, wherein the light pipe provides a diffused section.

3. The illuminated walking assistance apparatus according to embodiments 1-2, wherein the light-emitting member provides a high-intensity light.

4. The illuminated walking assistance apparatus according to embodiments 1-3, further comprising a source of electrical energy coupled through a control circuit to selectively energize the light-emitting member.

5. The illuminated walking assistance apparatus according to embodiments 1-4, wherein the source of electrical energy is a rechargeable battery.

6. The illuminated walking assistance apparatus according to embodiments 1-5, wherein the control circuit is disposed on a circuit board disposed in the handle.

7. The illuminated walking assistance apparatus according to embodiments 1-6, wherein the handle provides a USB port coupled to the circuit board for selectively charging the battery.

8. The illuminated walking assistance apparatus according to embodiments 1-7, wherein the control circuit comprises a digital control circuit.

9. The illuminated walking assistance apparatus according to embodiments 1-8, wherein the control circuit comprises an analog control circuit.

10. The illuminated walking assistance apparatus according to embodiments 1-9, further comprising an at least one motion sensor configured for detecting movement of the staff relative to the ground, thereby allowing the apparatus to determine when the apparatus is in use.

11. The illuminated walking assistance apparatus according to embodiments 1-10, wherein: upon the apparatus determining that the apparatus is in use, via the at least one motion sensor, the apparatus is configured for automatically activating the light-emitting member; and upon the apparatus determining that the apparatus is not in use, via the at least one motion sensor, the apparatus is configured for automatically deactivating the light-emitting member.

12. The illuminated walking assistance apparatus according to embodiments 1-11, further comprising a timer, whereby upon the apparatus determining that the apparatus has not been used for a pre-defined period of time, the apparatus is configured for automatically deactivating the light-emitting member.

13. The illuminated walking assistance apparatus according to embodiments 1-12, wherein the apparatus is configured for tracking a number of steps taken by a user based on data obtained by the at least one motion sensor.

14. The illuminated walking assistance apparatus according to embodiments 1-13, wherein the at least one motion sensor is in electrical communication with the on switch, whereby the at least one motion sensor is configured for being selectively activated and deactivated upon the on switch being pressed in a pre-defined pattern.

15. The illuminated walking assistance apparatus according to embodiments 1-14, wherein the apparatus is configured for selectively transmitting the step data to the at least one user device via the transceiver.

16. The illuminated walking assistance apparatus according to embodiments 1-15, further comprising an ambient light detector configured for measuring ambient light conditions proximal the apparatus, whereby upon the apparatus detecting the presence of a pre-defined amount of ambient light, via the light detector, the apparatus is configured for automatically deactivating the light-emitting member.

17. The illuminated walking assistance apparatus according to embodiments 1-16, further comprising a handle light positioned within the handle for use as a flashlight, the handle light in electrical communication with a handle light switch positioned on the apparatus for selectively activating and deactivating the handle light.

18. The illuminated walking assistance apparatus according to embodiments 1-17, further comprising an on switch in electrical communication with the light-emitting member for selectively activating and deactivating the light-emitting member.

19. The illuminated walking assistance apparatus according to embodiments 1-18, further comprising a flash switch in electrical communication with the light-emitting member, wherein the light-emitting member is configured for selectively flashing upon the flash switch being pressed in a pre-defined pattern.

20. The illuminated walking assistance apparatus according to embodiments 1-19, wherein the apparatus is configured for generating an audible alert upon the flash switch being pressed in a pre-defined pattern.

21. The illuminated walking assistance apparatus according to embodiments 1-20, further comprising a transceiver in selective communication with an at least one user device.

22. The illuminated walking assistance apparatus according to embodiments 1-21, wherein upon the transceiver and the at least one user device moving beyond communication range from one another, at least one of the transceiver and user device is configured for generating an "out of range" alert.

23. The illuminated walking assistance apparatus according to embodiments 1-22, wherein at least one of the apparatus and user device is configured for transmitting a pre-defined message to an at least one pre-defined recipient upon the flash switch being pressed in a pre-defined pattern.

24. The illuminated walking assistance apparatus according to embodiments 1-23, wherein the pre-defined message includes the current GPS coordinates of at least one of the apparatus and the user device.

25. The illuminated walking assistance apparatus according to embodiments 1-24, wherein the handle provides an at least one heartbeat sensor positioned for being in contact with a hand or finger of a user so as to selectively monitor a heartbeat of the user.

26. The illuminated walking assistance apparatus according to embodiments 1-25, wherein the at least one heartbeat sensor is in electrical communication with the on switch, whereby the at least one heartbeat sensor is configured for being selectively activated and deactivated upon the on switch being pressed in a pre-defined pattern.

27. The illuminated walking assistance apparatus according to embodiments 1-26, wherein the apparatus is configured for selectively transmitting the heartbeat data to the at least one user device via the transceiver.

28. The illuminated walking assistance apparatus according to embodiments 1-27, wherein the handle provides an at least one blood oxygen sensor positioned for being in contact with a hand or finger of a user so as to measure a blood oxygen level of the user.

29. The illuminated walking assistance apparatus according to embodiments 1-28, wherein the at least one blood oxygen sensor is in electrical communication with the on switch, whereby the at least one blood oxygen sensor is configured for being selectively activated and deactivated upon the on switch being pressed in a pre-defined pattern.

30. The illuminated walking assistance apparatus according to embodiments 1-29, wherein the apparatus is configured for selectively transmitting the blood oxygen data to the at least one user device via the transceiver.

31. The illuminated walking assistance apparatus according to embodiments 1-30, wherein the light-emitting member comprises an LED array including four LED chips supported on a substrate positioned within the light pipe.

32. The illuminated walking assistance apparatus according to embodiments 1-31, further comprising a red filter slidably engaged with the light pipe for selectively covering the light-emitting member, thereby reducing the effects of REM sleep cycle interruption during use of the apparatus at night.

33. The illuminated walking assistance apparatus according to embodiments 1-32, wherein the handle comprises antimicrobial properties.

34. An illuminated walking assistance apparatus comprising: an elongated staff having a ground-engaging tip portion at a first end and a handle at an opposing second end; the staff providing a light pipe positioned proximal the tip portion and having a light-emitting member disposed therein to selectively illuminate the ground proximal the tip portion; the staff further providing a red nightlight which is always on so as to facilitate locating the apparatus in a dark environment; a flash switch in electrical communication with the light-emitting member; and a transceiver in selective communication with an at least one user device; wherein at least one of the apparatus and user device is configured for transmitting a pre-defined message to an at least one pre-defined recipient upon the flash switch being pressed in a pre-defined pattern.

35. An illuminated walking assistance apparatus comprising: an elongated staff having a ground-engaging tip portion at a first end and a handle at an opposing second end; the staff providing a light pipe positioned proximal the tip portion and having a light-emitting member disposed therein to selectively illuminate the ground proximal the tip portion; the staff further providing a red nightlight which is always on so as to facilitate locating the apparatus in a dark environment; and a red filter slidably engaged with the light pipe for selectively covering the light-emitting member, thereby reducing the effects of REM sleep cycle interruption during use of the apparatus at night.

In closing, regarding the exemplary embodiments of the present invention as shown and described herein, it will be appreciated that an illuminated walking assistance apparatus is disclosed and configured for providing general illumination in the immediate vicinity of the apparatus along with additional features and benefits described herein. Because the principles of the invention may be practiced in a number of configurations beyond those shown and described, it is to be understood that the invention is not in any way limited by the exemplary embodiments, but is generally directed to an illuminated walking assistance apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the terms "about" and "approximately." As used herein, the terms "about" and "approximately" mean that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art, or at least encompassing a range of plus or minus ten percent above and below the value of the stated characteristic, item, quantity, parameter, property, or term.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc. —for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112 (f) will begin with the words "means for," but use of the term "for" in any other context is not intended to invoke treatment under 35 U.S.C. § 112 (f). Accordingly, Applicant reserves the right to pursue additional claims after filing this application, in either this application or in a continuing application.

It should be understood that any methods disclosed herein, along with the order in which the respective elements of any such method are performed, are purely exemplary. Depending on the implementation, they may be performed in any order or in parallel, unless indicated otherwise in the present disclosure.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor (s) believe that the claimed subject matter is the invention.

What is claimed is:

1. An illuminated walking assistance apparatus comprising:

an elongated staff having a ground-engaging tip portion at a first end and a handle at an opposing second end, the handle having antimicrobial properties;

the staff providing a light pipe positioned proximal the tip portion and having a light-emitting member disposed within a diffused section of the light pipe to selectively illuminate the ground proximal the tip portion, the light-emitting member providing both a white colored light source and a red colored light source for selectively illuminating the ground with a white colored light or red colored light; and a pilot light positioned in the handle which is always on so as to facilitate locating the apparatus in a dark environment.

2. The illuminated walking assistance apparatus of claim 1, further comprising an at least one motion sensor configured for detecting movement of the staff relative to the ground, thereby allowing the apparatus to determine when the staff is in use.

3. The illuminated walking assistance apparatus of claim 2, wherein:

upon the apparatus determining that the staff is in use, via the at least one motion sensor, the apparatus is configured for automatically activating the light-emitting member; and upon the apparatus determining that the staff is not in use, via the at least one motion sensor, the apparatus is configured for automatically deactivating the light-emitting member.

4. The illuminated walking assistance apparatus of claim 3, further comprising a timer, whereby upon the apparatus determining that the staff has not been used for a pre-defined period of time, the apparatus is configured for automatically deactivating the light-emitting member.

5. The illuminated walking assistance apparatus of claim 2, wherein the apparatus is configured for tracking a number of steps taken by a user based on data obtained by the at least one motion sensor.

6. The illuminated walking assistance apparatus of claim 1, further comprising a handle light positioned within the handle for use as a flashlight, the handle light in electrical communication with a handle light switch positioned on the apparatus for selectively activating and deactivating the handle light.

7. The illuminated walking assistance apparatus of claim 1, further comprising an on switch in electrical communication with the light-emitting member for selectively activating and deactivating the light-emitting member.

8. The illuminated walking assistance apparatus of claim 1, further comprising a flash switch in electrical communication with the light-emitting member, wherein the light-emitting member is configured for selectively flashing upon the flash switch being pressed in a pre-defined pattern.

9. The illuminated walking assistance apparatus of claim 8, wherein the apparatus is configured for generating an audible alert upon the flash switch being pressed in a pre-defined pattern.

10. The illuminated walking assistance apparatus of claim 9, further comprising a transceiver in selective communication with an at least one user device.

11. The illuminated walking assistance apparatus of claim 10, wherein upon the transceiver and the at least one user device moving beyond communication range from one another, at least one of the transceiver and user device is configured for generating an "out of range" alert.

12. The illuminated walking assistance apparatus of claim 10, wherein at least one of the apparatus and user device is configured for transmitting a pre-defined message to an at least one pre-defined recipient upon the flash switch being pressed in a pre-defined pattern.

13. The illuminated walking assistance apparatus of claim 12, wherein the pre-defined message includes the current GPS coordinates of at least one of the apparatus and the user device.

14. The illuminated walking apparatus of claim 10, wherein the handle provides an at least one heartbeat sensor positioned for being in contact with a hand or finger of a user so as to selectively monitor a heartbeat of the user.

15. The illuminated walking assistance apparatus of claim 1, further comprising a red filter slidably engaged with the light pipe for selectively covering the light-emitting member, thereby reducing the effects of REM sleep cycle interruption during use of the apparatus at night.

16. The illuminated walking assistance apparatus of claim 1, further comprising an ambient light detector configured for measuring ambient light conditions proximal the apparatus, whereby upon the apparatus detecting the presence of a pre-defined amount of ambient light, via the light detector, the apparatus is configured for automatically deactivating the light-emitting member.

17. The illuminated walking assistance apparatus of claim 1, wherein the handle provides an at least one blood oxygen sensor positioned for being in contact with a hand or finger of a user so as to measure a blood oxygen level of the user.

18. The illuminated walking assistance apparatus of claim 1, further comprising a source of electrical energy coupled through a control circuit to selectively energize at least one of the light-emitting member and pilot light.

19. An illuminated walking assistance apparatus comprising:

an elongated staff having a ground-engaging tip portion at a first end and a handle at an opposing second end;

the staff providing a light pipe positioned proximal the tip portion and having a light-emitting member disposed therein to selectively illuminate the ground proximal the tip portion;

a pilot light positioned in the handle which is always on so as to facilitate locating the apparatus in a dark environment;

an at least one motion sensor configured for detecting movement of the staff relative to the ground, thereby allowing the apparatus to determine when the staff is in use; and a timer;

whereby, upon the apparatus determining that the staff is in use, via the at least one motion sensor, the apparatus is configured for automatically activating the light-emitting member; and whereby, upon the apparatus determining that the staff has not been used for a pre-defined period of time, via the at least one motion sensor and timer, the apparatus is configured for automatically deactivating the light-emitting member.

20. An illuminated walking assistance apparatus comprising:

an elongated staff having a ground-engaging tip portion at a first end and a handle at an opposing second end;

the staff providing a light pipe positioned proximal the tip portion and having a light-emitting member disposed therein to selectively illuminate the ground proximal the tip portion;

a pilot light positioned in the handle which is always on so as to facilitate locating the apparatus in a dark environment; and an at least one motion sensor configured for detecting movement of the staff relative to the ground, thereby allowing the apparatus to track a number of steps taken by a user based on data obtained by the at least one motion sensor.

* * * * *